US007266877B2

(12) United States Patent
Pittau

(10) Patent No.: US 7,266,877 B2
(45) Date of Patent: Sep. 11, 2007

(54) TOOLING FOR MANUFACTURING LARGE-SECTION RIGID HARNESSES

(75) Inventor: Serge Pittau, La Bouilladisse (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 11/395,246

(22) Filed: Apr. 3, 2006

(65) Prior Publication Data

US 2006/0223353 A1 Oct. 5, 2006

(30) Foreign Application Priority Data

Apr. 1, 2005 (FR) .................................. 05 03230

(51) Int. Cl.
*H01R 43/00* (2006.01)
*H01R 43/04* (2006.01)
*B23P 23/00* (2006.01)
*B23P 19/00* (2006.01)

(52) U.S. Cl. ..................... 29/564.4; 29/33 M; 29/33 F; 29/742; 29/850

(58) Field of Classification Search ................. 29/564, 29/564.1, 564.2, 564.4, 564.6, 564.8, 566.1, 29/566.2, 566.3, 742, 747, 748, 749, 755, 29/759, 760, 822, 825, 836, 850, 861, 33 M, 29/33 F; 198/735.1; 72/409.14, 409.16, 72/409.19; 211/60.1; 81/9.51
See application file for complete search history.

(56) References Cited

U.S. PATENT DOCUMENTS 4,107,838 A * 8/1978 Keen et al. ................ 29/564.1
4,126,935 A * 11/1978 Rhines et al. ................. 29/857
4,446,615 A * 5/1984 Talley ......................... 29/742
4,554,725 A * 11/1985 Over et al. ................ 29/564.4
4,677,734 A 7/1987 Bloch et al.
4,965,929 A * 10/1990 Aligue ........................ 29/742
5,016,345 A * 5/1991 Aligue et al. ................. 29/742
5,457,875 A * 10/1995 Ohta et al. ................. 29/33 M
5,781,990 A * 7/1998 Seidler et al. ............. 29/564.4
6,829,821 B1 * 12/2004 Hellemans .................. 29/33 F

FOREIGN PATENT DOCUMENTS

EP 0 413 655 2/1991

* cited by examiner

*Primary Examiner*—Dana Ross
(74) *Attorney, Agent, or Firm*—Young & Thompson

(57) ABSTRACT

The invention relates to tooling for preparing a large-section harness comprising at least one cable. The tooling includes an output module (19) for receiving the terminal end of the cable. The output module (19) comprises three tools mounted on an output body (20) that is movable on a tray (1) so that each of the tools can be presented in alternation in register with the terminal end of the cable, the tools comprising a first tool (22) for marking cutting and stripping lengths for the cable, a second tool (28) for marking the position and the orientation of the terminal connection member (29), and a third tool (30) for checking that the terminal connection member (29) is in the proper position and orientation after it has been crimped to the terminal end of the cable.

35 Claims, 3 Drawing Sheets

TOOLING FOR MANUFACTURING LARGE-SECTION RIGID HARNESSES

The invention relates to the field of manufacturing an electric cable, and more particularly a harness of large section. The invention relates to tooling for manufacturing such a harness of large section, in particular for shaping it and for fitting its ends with connection members.

BACKGROUND OF THE INVENTION

Large-section harnesses make use of large-diameter conductors, and generally present a high degree of stiffness, which stiffness is likely to vary along the length of the harness. Such harnesses are used for example for cabling rotorcraft, in which they are installed in defined positions. The stiffness of such harnesses means that while they are being installed they cannot be changed either in shape or in length, and they provide only very restricted latitude for movement. Furthermore, it can be necessary for such harnesses to pass through partitions, and they can be fitted with fastener members for fastening them to such partitions. As a result, prior to being installed, such a harness must be prepared in a workshop to comply with specifications that are strict concerning their length, or indeed the lengths of the various branches making them up, concerning their shape, concerning the way in which they are fitted with terminal connectors at their ends, both in terms of the positioning and the orientation of such terminal connectors, and possibly also concerning the installation of at least one fastener member, such as an element for passing through a partition, in a middle zone thereof.

Tooling has been proposed for manufacturing large-section harnesses, enabling an operator to shape the harness and fit it with connection members. Such tooling comprises a work surface over which the harness extends, being held by modules that may optionally be suitable for allowing it to be twisted, and serving for installing connection members. By way of example, such modules comprise at least one input module and at least one output module for holding the corresponding ends of the harness for the purpose of mounting connection members, with the harness optionally being twisted between said input and output modules in order to shape it to comply with a predetermined outline visible on the work surface.

The operator begins by stripping a starting end of the cable and installing the corresponding connection member. With the starting end of the cable installed on the input module, the operator shapes the harness all the way to the output module, where the terminal connection member is installed. Optionally, fastener members, in particular for passing through partitions, are also installed along the length of the harness.

Even when such tooling is used, numerous harnesses are rejected because they do not comply with specifications. For example, crimping on the connection members leads to variations in harness lengths, and it is difficult to prepare such a harness to the specified length. Furthermore, it is essential for the ends of the harness to be stripped over the proper length, since otherwise the harness might present defective crimping of the connection members. In addition, installing fastener members in an accurately-defined position continues to be difficult. Finally, when preparing the harness, account needs to be taken of the fact that it might well present zones having different stiffnesses. The positioning of different zones does not enable the harness to be laid in a single plane during manufacture. Such a constraint requires the preparation of the harness to be organized as a plurality of manufacture stages, occupying planes that are different in three dimensions.

OBJECT AND SUMMARY OF THE INVENTION

The object of the present invention is to propose tooling for preparing a large-section harness that facilitates the successive operations an operator needs to accomplish during such preparation, and that makes it possible while the cable is being prepared to check that it does indeed comply with the corresponding specifications. The present invention seeks more particularly to propose such tooling that is fitted with means for assisting the operator at each of the harness preparation steps, and means for checking that the harness is in compliance once it has been fabricated.

The tooling of the present invention is tooling for preparing a large-section harness comprising at least one conductor cable. The tooling is for shaping the harness and placing members on the harness including at least starting and terminal connection members associated respectively with a starting end of the cable and with a terminal end of the cable. The tooling comprises a work surface supporting a plurality of harness-holder modules, including at least one input module for holding the starting end of the cable and at least one output module for holding the terminal end of the cable.

According to the present invention, tooling of the above-specified kind is recognizable mainly in that the output module comprises at least three tools mounted on an output body and comprising:

- a first tool for marking the cutting length of the cable and at least one stripping length for the terminal end of the cable;
- a second tool for marking the position and the orientation of the terminal connection member that is to be fitted to the terminal end of the cable, the second tool comprising first positioning means for positioning the terminal connection member; and
- a third tool for checking the position and the orientation of the terminal connection member after it has been crimped to the terminal end of the cable, the third tool comprising second positioning means for positioning the terminal connection member.

Furthermore, the output body is movably mounted on the work surface to present alternately the tools it carries in register with the arrival position reached by the terminal end of the cable in front of the output module.

These dispositions are such that in succession starting from a displacement of the output body, the operator can, in a first step, easily and reliably mark the cutting and stripping lengths at the terminal end of the cable, and then in a second step place the connection member on the terminal end of the cable in the proper position and orientation for crimping purposes, and then in a third step, after the connection member has been crimped on, check that the resulting cable has the correct length and that the connection member is positioned properly within a specific tolerance range as determined by the third tool.

The third tool is, in particular, mounted to be movable on the output body in order to check that the cable has the correct length, and to check the position and the orientation of the terminal connection member. This inspection is performed in a tolerance range corresponding to the extreme positions to which the third tool can move relative to the output body.

These dispositions are such that, by observing whether or not it is possible to place the connection member fitted to the terminal end of the cable on the third tool somewhere within its range of movement relative to the output body, the operator has means that are simple, easy to operate, and reliable for checking that the harness compiles with its specifications.

More particularly, the third tool is mounted to move on the output body in at least one direction corresponding to the orientation of the terminal end of the harness.

The first tool advantageously includes a first passage for passing the terminal end of the cable, at least in part between two walls. The proximal and distal ends of the first passage are open so as to allow the cable to pass through regardless of its length. The distal end of the first passage forms a mark identifying the cutting length of the cable, at least one mark provided on the first passage giving a position for stripping the terminal end of the cable.

The first passage is more particularly provided with at least two marks identifying respective cable stripping positions. The proximal end of the first passage constitutes in particular a mark for stripping the cable. By way of example, the first passage is formed between the flanges of a channel-section bar. The distal end of the web of the bar constitutes the mark for the cutting length of the cable. At least one notch in the side wall thereof constitutes a first stripping mark. The proximal end of the bar constitutes a second stripping mark.

In a preferred embodiment of the means for positioning the terminal connection member fitted to the second and third tools, each of these means has a respective second passage for receiving the terminal connection member and means for holding it by interlocking therewith.

The second passages for receiving the terminal connection member are advantageously formed between the walls of a channel-section bar.

When the terminal connection member is a lug, e.g. shaped like a washer, the means for holding the lug can be constituted by a peg, for example. In some circumstances, the connection member may be a coaxial connection member. If the terminal connection member is a coaxial connection member, then the means for holding the coaxial connection member can be constituted, for example, by at least one step formed at the distal end of the second passage. With the connection member inserted in a body of the connector, the output module preferably includes a fourth tool movably mounted on the output body to check that the position and the orientation of the connector body lies within a tolerance range corresponding to the extreme positions over which the fourth tool can move relative to the output body. It should be observed that a plurality of connection members may be inserted in a single connector body.

In a first variant embodiment, the output body is a carriage mounted to move in translation on the work surface laterally relative to the orientation of the terminal end of the cable. In a second variant embodiment, the output body is a turret mounted to move in rotation on the work surface. The turret is fitted with first locking means for locking its angular position depending on the positions of its various tools.

By way of example, the first locking means may be constituted by an index member carried by the turret and suitable for co-operating with housings formed in the work surface.

The input module preferably includes means for receiving the starting connection member, or where appropriate a starting connector body having at least one starting connection member inserted therein, and second locking means for locking the starting connection member inside receiver means. The receiver means for receiving the starting connection member, or where appropriate the starting connector body, may be constituted for example by a shoe housing the starting connection member or the starting connector body. The second locking means may be constituted, for example, by a spring-loaded button for pressing against the starting connection member or the starting connector body inside the shoe.

Preferably, the starting module includes a marking tool for identifying at least one stripping length at the starting end of the cable. This marking tool may be constituted, for example, by a third passage for receiving the starting end of the cable. The third passage is advantageously blind at its distal end, so as to form an abutment for the end of the cable. The walls of the third passage serve in particular to carry at least one stripping mark. In addition, the proximal end of the passage advantageously constitutes a second stripping mark. For example, the walls of the third passage may include at least one shoulder forming a stripping mark between its distal and proximal ends.

Optionally, the tool may include at least one intermediate module for positioning a fastener member on the harness. More particularly, the intermediate module may comprise at least one support for the fastener member and third locking means for locking the fastener member on the support. When the fastener member is constituted in particular by harness-clamping means including a wall, the support is formed by a first body having slideways for receiving said walls, with the third locking means being constituted by a second body secured to the work surface. The fastener member may be constituted, for example, by an element for passing through a partition and provided with at least one heat-shrink sheath for shrinking onto the harness, or with a stuffing box, or with any other equivalent means for clamping onto the harness.

The tooling may include at least one pair of intermediate modules. These modules co-operate with each other and present intersecting orientations, so that once a fastener member has been put in place on the harness by means of a first intermediate module, the harness can be taken away from the work surface and its fastener member can be placed on the second intermediate module in a different orientation so as to be able to continue preparing the harness in spite of a possible change in the plane in which the harness extends.

The work surface preferably carries an outline to be followed by the harness so as to make it easier to guide the operator while shaping the harness. This outline optionally includes marks for positioning a color marker on the harness suitable for use when the harness is installed on site.

The work surface may include guides for guiding the harness while it is being shaped.

In a preferred embodiment, the work surface is constituted by a removable tray fitted on a workbench. The tray forms part of a set of trays for preparing respective harnesses, the trays being stored in a rack located close to the workbench.

The workbench preferably includes means for positioning a tray and holding it stationary, in particular against possible twisting forces that might be exerted on the harness while it is being prepared. By way of example, the means for positioning a tray and holding it stationary comprise, in association, both slideways for guiding the tray via at least one of its sides, and tray-locking members for locking the tray in position by pressing against the slideways. The tray-locking members may be constituted, for example, by abutments including eccentrics and located at the side of the tray remote from its side with which it presses against the slideways.

It should be observed that the harness might be fitted at each of its ends with one or more connection members inserted in a respective end connector body. It will thus be understood that the harness might be fitted with respective starting and terminal connector bodies, each receiving at least one respective starting or terminal connection member.

From the above-described disposition, it can be seen that the operator is assisted throughout the various steps of manufacturing the harness, all the way to inspection during a final operation of verifying that the resulting harness complies with its specifications.

BRIEF DESCRIPTION OF THE DRAWINGS

The present invention can be better understood and details relating to it appear from the following description of embodiments given with reference to the figures in the accompanying sheets of drawings, in which.

MORE DETAILED DESCRIPTION

Figure 1:
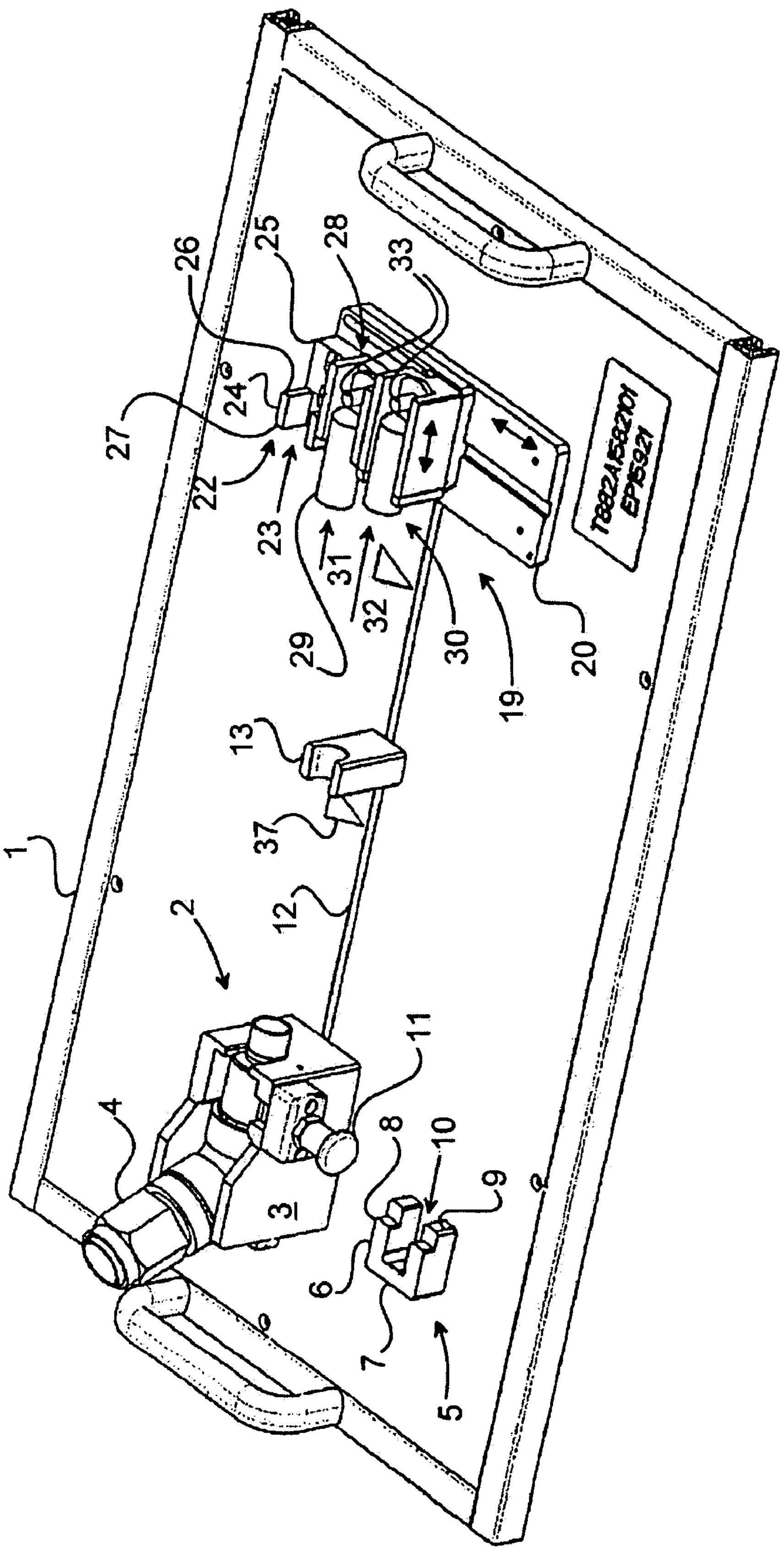
FIG. 1 is a perspective view of tooling in a first embodiment of the invention.

In the figures, the tooling shown is for preparing large-section harnesses, each comprising at least one cable. Such preparation consists in particular in crimping starting and terminal connection members to the corresponding ends of the cables, and possibly, where appropriate, installing an intermediate fastener member, such as an element for passing through a partition. The connection members are, in particular, for integrating in a connector body.

The tooling comprises a work surface formed by a tray 1. Such a tray 1 is designed to be secured to a workbench. It should be observed that such dispositions provide the advantage of enabling different trays 1 selected from a plurality of trays to be placed in turn on the workbench for preparing respective harnesses. Such a plurality of trays can be stored in a rack, for example, with the operator selecting the tray that corresponds to requirements and securing it to the workbench. The workbench is not shown in the figures, but it includes means for securing the tray 1 so as to hold the tray securely against any twisting forces that might be applied by the cables making up the harness while the harness is being prepared.

The tray 1 is fitted with at least one starting module 2. The starting module 2 comprises a shoe 3 for receiving a starting connector body 4. At least one connection member is integrated in the starting connector body 4 and is crimped to the cable. In order to crimp the connection member to the cable (not shown in the figures), the operator makes use, in a prior step, of a tool 5 for identifying the stripping lengths at the starting end of the cable. The tool 5 is located close to the shoe 3 and is formed by a U-shaped part having side walls 6 that form a third passage 10 for receiving the starting end of the cable, and an end wall 7 that constitutes an abutment member against which the end of the cable is pressed. This U-shaped part 5 has a shoulder 8 forming a first stripping mark, the distal end 9 of the third passage 10 forming a second stripping mark. The operator places the starting end of the cable in the third passage 10 and marks on the cable the locations of the various stripping lengths. The operator then withdraws the starting end of the cable, crimps on the connection member and inserts the connection member into the corresponding connector body 4. In a following step, the operator takes the starting end of the cable fitted with the connector body 4 and installs it in the shoe 3 of the starting module 2. The shoe 3 is fitted with second locking means for locking the connector body 4, e.g. constituted in the embodiments shown by a spring-loaded finger 11 for pressing against the connector body 4 inside the shoe 3. In the embodiment shown in FIG. 3, it can be seen that the tooling has two such starting modules 2 for receiving the starting ends of respective cables.

The harness is then shaped to comply with marking 12 outlined on the surface of the tray 1. Optionally, as shown in FIG. 1 and in FIG. 3, the tray 1 is fitted with supports 13 and 14 for guiding the harness along the outline 12.

Figure 3:
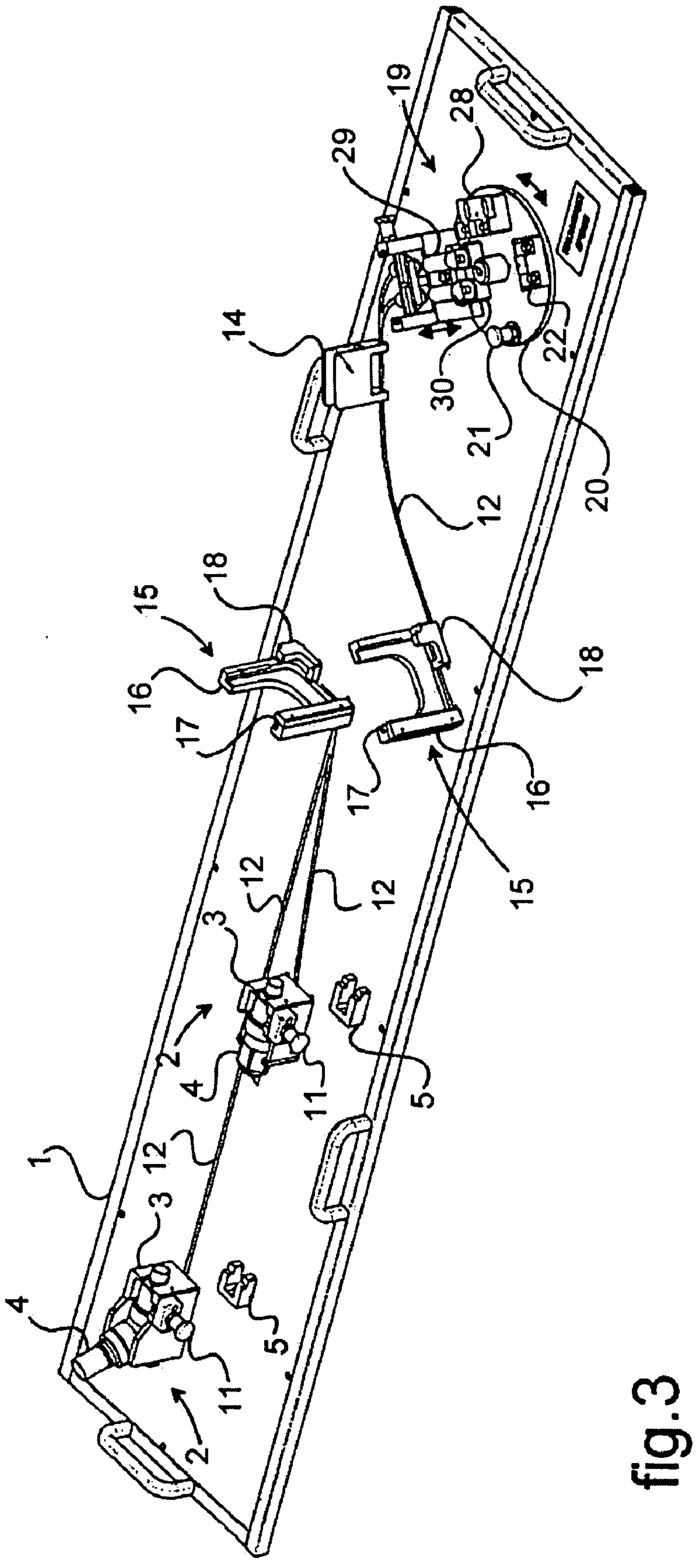
FIG. 3 is a perspective view of tooling in a third embodiment of the invention.

In FIG. 3, an element for passing through a partition is provided for installation on the harness between its two ends. Such an element for passing through a partition (not shown in the figure) commonly comprises a plate with heat-shrink sheaths for shrinking onto the cables of the harness. In order to put such an element into place, the tray 1 is fitted with an intermediate module 15. The intermediate module 15 comprises a support 16 for the partition-passing element, and third locking means for locking the support to the partition element. The support is formed of a first body including slideways 17 for receiving the edges of the plate of the partition-passing element, while the third locking means are constituted by a second body 18 secured to the tray 1. Once the partition-passing element has been installed on the harness, the harness is removed from the tray 1 and the partition element is installed in another intermediate module 15 close to the preceding module and oriented in intersecting manner. The cable is then shaped to follow an outline 12 marked on the surface of the tray 1.

Returning to the other figures, the tray 1 is fitted with an output module 19. The output module 19 comprises an output body 20 movably mounted on the tray 1. In the embodiments shown in FIGS. 1 and 2, the body 10 is organized as a carriage that is movable in translation on the tray 1 in a direction that extends laterally relative to the terminal end of the cable. In the embodiment shown in FIG. 3, the output body 20 is organized as a turret 20 rotatably mounted on the tray 1. The turret 20 is fitted with first locking means for locking it in different angular positions, e.g. constituted in the example shown by an index member 21 carried by the turret 20 and suitable for co-operating with housings formed in the tray 1.

Figure 2:
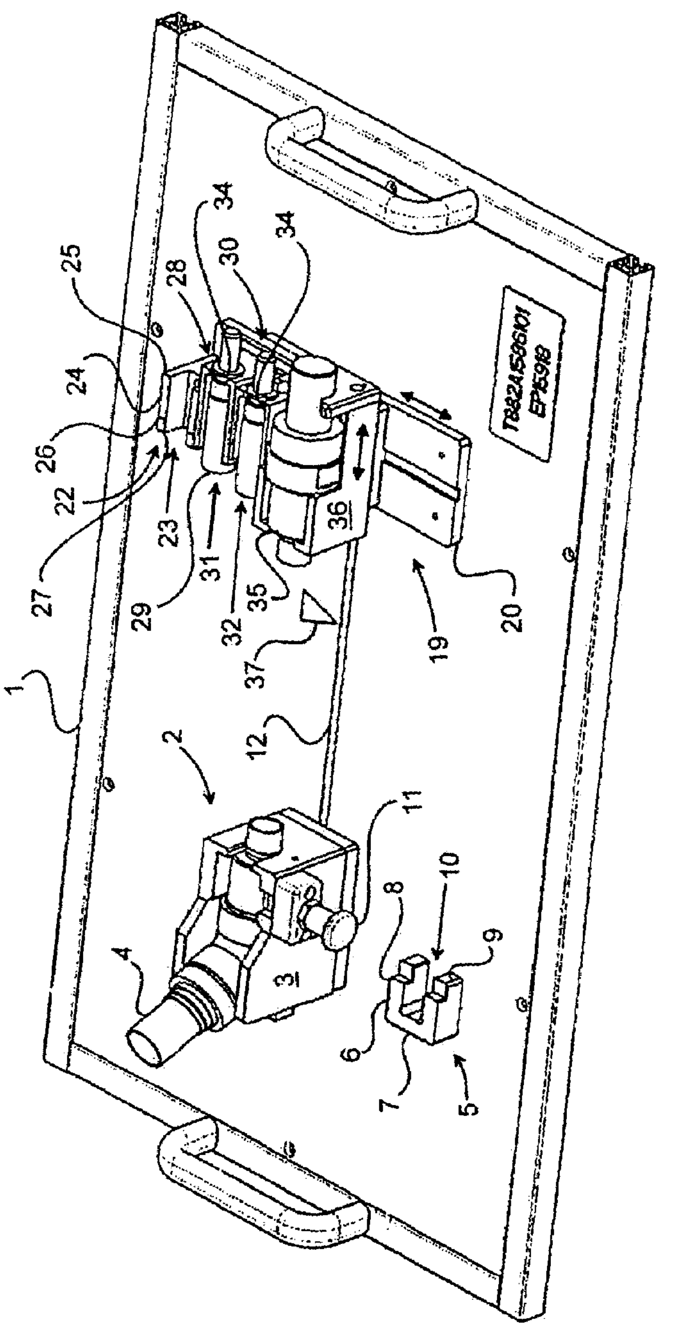
FIG. 2 is a perspective view of tooling in a second embodiment of the invention.

The output body 20 is fitted with at least three tools. A first tool 22 serves to mark the cutting length for the terminal end of the cable, and to mark the various stripping lengths. More particularly, the first tool 22 is shaped as a first passage 23 for receiving the terminal end of the cable. By way of example, the first passage 23 is defined between the walls 24 of a channel-section bar. The distal end 25 of the first passage 23 constitutes a mark for cutting the terminal end of the cable. The bar includes a first mark 26 for a stripping length. In FIG. 1, the first mark 26 for a stripping length is formed by a notch made in the walls 24 of the bar. In FIG. 2, the first stripping mark 26 is formed by contrasting markings made on the edge faces of the walls 24 of the bar. The proximal end 27 of the first passage 23 constitutes a second stripping mark. Once the operator has marked the cable with the various cutting and stripping lengths, the operator removes the terminal end of the cable from the first tool 22 in order to cut and strip said end.

Thereafter, the operator uses a second tool 28 formed on the output body 20. This second tool 28 is designed to receive a connection member 29 for holding it in the required orientation at the required length. The operator installs the previously-stripped terminal end of the cable in the connection member 29 and then crimps them together.

The output body 20 includes a third tool 30 for checking the position and the orientation of the connection member 29, and for checking that the cable has the required length. It should be observed that the position of the third tool 30 is offset rearwards relative to the second tool, because of the lengthening imparted to the cable during the stripping operation. This third tool 30 is for receiving the connection member 29 already crimped on the cable.

In the embodiments shown, the second tool 28 and the third tool 30 have respective third passages 31 and 32 formed between the walls of respective channel-section bars. These third passages 31 and 32 are for receiving the connection member 29 and they are fitted with means for holding it by interlocking therewith. In FIG. 1, the connection member 29 is lug with a hole and the means for holding the lug are constituted by a peg 33. In FIG. 2, the connection member 29 is a coaxial connector, and the means for holding this connection member 29 are constituted by at least one step 34 formed at the distal end of each of the third passages 31 and 32.

The third tool 30 is mounted to move on the output body 20 so that cable compliance is checked by whether or not it is possible to install the connection member 29 on the third tool 30 within its range of movement between its extreme positions. As a result, cable compliance is checked directly on the tooling used for cable manufacture, on the basis of a simple operation of installing the terminal connection member 29 on the third tool.

In the embodiment shown in FIG. 2, the connection member 29 is integrated in a connector 35. The output module 19 has a fourth tool 36 movably mounted on the output body 20 like the third tool 30 in order to check that the position and the orientation of the connector body 35 lie within the movement range of the fourth tool 36 on the output body 20.

In FIGS. 1 and 2, the outline 12 on the surface of the tray 1 is associated with marks 37 for positioning color markers on the harness, such as tapes, that are used while the harness is being installed on site.

What is claimed is:

1. Tooling for preparing a large-section harness comprising at least one conductor cable, the tooling serving to shape the harness and place members on the harness, said members including at least starting and terminal connection members (29) associated respectively with a starting end of the cable and a terminal end of the cable, the tooling comprising a work surface (1) for supporting a plurality of harness-holding modules, including at least one input module (2) for holding the starting end of the cable, and at least one output module (19) for holding the terminal end of the cable, wherein the output module (19) comprises at least three tools mounted on an output body (20) comprising:

a first tool (22) for marking the cutting length of the cable and at least one stripping length for the terminal end of the cable;

a second tool (28) for marking the position and the orientation of the terminal connection member (29) that is to be fitted to the terminal end of the cable, the second tool (28) comprising first positioning means for positioning the terminal connection member (29); and a third tool (30) for checking the position and the orientation of the terminal connection member (29) after it has been crimped to the terminal end of the cable, the third tool (30) comprising second positioning means for positioning the terminal connection member (29);

the output body (20) being movably mounted on the work surface (1) to present alternately the at least three tools (22, 28, 30) it carries in register with the arrival position reached by the terminal end of the cable in front of the output module (19).

2. Tooling according to claim 1, wherein the third tool (30) is movably mounted on the output body (20) in order to check that the cable has the correct length, and to check that the terminal connection member (29) has the correct position and orientation, within a tolerance range corresponding to the extreme positions to which the third tool (30) can move relative to the output body (20).

3. Tooling according to claim 2, wherein the third tool (30) is movably mounted on the output body (20) to move in at least one direction corresponding to the orientation of the terminal end of the harness.

4. Tooling according to claim 1, wherein the first tool (22) includes a first passage (23) for passing the terminal end of the cable at least in part between two walls (24), the proximal and distal ends of the first passage (23) being open to allow the cable to be passed through regardless of its length, the distal end (25) of the first passage (23) forming a mark for the cutting length of the cable, and at least one mark (26) formed on the first passage (23) identifying a stripping position for the terminal end of the cable.

5. Tooling according to claim 4, wherein the first passage (23) is provided with at least two marks (26, 27) for marking respective cable stripping positions.

6. Tooling according to claim 5, wherein the proximal end (27) of the first passage (23) constitutes a stripping mark of the cable.

7. Tooling according to claim 6, wherein the first passage (23) is formed between the flanges (24) of a channel-section bar, whose distal end (25) constitutes the cutting length mark for the cable, and having at least one notch (26) in its side walls (24) constituting a first stripping mark, and whose proximal end (27) constitutes a second stripping mark.

8. Tooling according to claim 1, wherein each of the positioning means fitted to each of the second and third tools (28, 30) for positioning the terminal connection member (29) includes a respective second passage (31, 32) for receiving the terminal connection member (29), and respective means (33, 34) for holding said member by interlocking therewith.

9. Tooling according to claim 8, wherein the second passages (31, 32) for receiving the terminal connection member (29) are formed between the walls of a channel-section bar.

10. Tooling according to claim 9, wherein the terminal connection member (29) is a lug, and the means for holding the lug are constituted by a peg (33).

11. Tooling according to claim 9, wherein the terminal connection member (29) is a coaxial connection member, and the means for holding said connection member are constituted by at least one step (34) formed at the distal end of the second passage (31, 32).

12. Tooling according to claim 11, wherein the connection member (29) is inserted in a connector body (35), and the output module (19) includes a fourth tool (36) movably mounted on the output body (20) for checking that the position and the orientation of the connector body (35) lie in a tolerance range corresponding to the extreme positions of the fourth tool (36) relative to the output body (20).

13. Tooling according to claim 1, wherein the output body (20) is a carriage mounted to move in translation on the work surface (1) laterally relative to the orientation of the terminal end of the cable.

14. Tooling according to claim 1, wherein the output body (20) is a turret rotatably mounted on the work surface (1), said turret (20) being fitted with first locking means (21) for locking its angular position depending on the positions of the various tools.

15. Tooling according to claim 14, wherein said first locking means are constituted by an index member (21) carried by the turret (20) and suitable for co-operating with housings formed in the work surface (1).

16. Tooling according to claim 1, the starting connection member being inserted in a connector body (4), wherein the input module (2) includes receiver means (3) for receiving the connector body (4) and second locking means (11) for locking the body (4) inside the receiver means (3).

17. Tooling according to claim 16, wherein the receiver means for receiving the starting connection member are constituted by a shoe (3) housing the connector body (4), the second locking means being constituted by a spring-loaded button (11) for pressing against the connector body (4) inside the shoe (3).

18. Tooling according to claim 1, wherein the at least one input module (2) includes a marking tool (5) for marking at least one stripping length for the starting end of the cable.

19. Tooling according to claim 18, wherein said marking tool (5) is constituted by a third passage (10) for receiving the starting end of the cable, the third passage (10) being blind at its distal end (7) to form an abutment member for the end of the cable, the walls (6) of the third passage (10) carrying at least one stripping mark (8).

20. Tooling according to claim 19, wherein the proximal end (9) of the third passage (10) constitutes a stripping mark.

21. Tooling according to claim 19, wherein the walls (6) of the third passage (10) include at least one shoulder (8) forming a stripping mark between their distal and proximal ends (9, 7).

22. Tooling according to claim 1, including at least one intermediate module (15) for placing a fastener member on the harness.

23. Tooling according to claim 22, wherein the intermediate module (15) comprises at least one support (16) for supporting the fastener member, and third locking means (17, 18) for locking said fastener member on the support (16).

24. Tooling according to claim 23, wherein the fastener member being constituted by harness-clamping means including a wall, the support (16) is formed by a first body having slideways (17) for receiving the edges of said wall, the third locking means (18) being constituted by a second body secured to the work surface (1).

25. Tooling according to claim 24, wherein the fastener member is an element for passing through a partition, the element being provided with at least one heat-shrink sheath for shrinking onto the harness.

26. Tooling according to claim 24, wherein the fastener member is a stuffing box.

27. Tooling according to claim 1, including at least one pair of intermediate modules (15), these modules (15) being oriented in intersecting manner so that once a fastener member has been put into place on the harness by means of a first intermediate module (15), the harness can be withdrawn from the work surface (1) and the fastener member can be placed in the second intermediate module (15) so as to continue with preparation of the harness in spite of a change in the plane in which the harness extends.

28. Tooling according to claim 1, wherein the work surface (1) carries an outline (12) along which the harness is to extend in order to facilitate guidance of the operator while shaping the harness.

29. Tooling according to claim 28, wherein the outline (12) includes marks (37) for identifying positions where color markers are to be put into place on the harness.

30. Tooling according to claim 1, wherein the work surface (1) includes guides (13, 14) for guiding the harness while it is being shaped.

31. Tooling according to claim 1, wherein the work surface (1) is constituted by a removable tray fitted on a workbench, said tray forming part of a set of trays for use in manufacturing respective harnesses and stored in a rack.

32. Tooling according to claim 31, wherein the workbench includes means for positioning the tray (1) and holding it stationary.

33. Tooling according to claim 32, wherein the means for positioning the tray (1) and holding it stationary comprise, in association, both slideways for guiding the tray (1) via at least one of its sides, and tray-locking members pressing against the slideways.

34. Tooling according to claim 33, wherein the tray-locking members are constituted by eccentric abutments disposed at the side of the tray (1) remote from the side with which it presses against the slideways.

35. Tooling according to claim 1, wherein starting and terminal connector bodies (4, 35) respectively house at least one starting or terminal connection member.

* * * * *